United States Patent Office 3,658,739
Patented Apr. 25, 1972

3,658,739
HOT-MELT ADHESIVE COMPOSITION CONTAINING HYDROGENATED PINE GUM
David A. Berry and Albert R. Bunk, Columbus, Ohio, and Noah J. Halbrook, Walter H. Schuller, and Ray V. Lawrence, Lake City, Fla., assignors to the United States of America as represented by the Secretary of Agriculture
No Drawing. Filed Feb. 27, 1970, Ser. No. 15,231
Int. Cl. C09j 3/26
U.S. Cl. 260—24
5 Claims

ABSTRACT OF THE DISCLOSURE

Hot-melt adhesive composition consisting essentially of a plasticized blend of low and high-molecular-weight polyvinyl acetate resins in which up to about 55 percent by weight of the polyvinyl acetate resin is replaced by a hydrogenated pine gum.

---

A non-exclusive, irrevocable, royalty-free license in the invention herein described throughout the world for all purposes of the United State Government, with the power to grant sublicenses for such purposes, is hereby granted to the Government of the United States of America.

This invention relates to hot-melt adhesive compositions which are applied hot to various substrates and which upon cooling form a bond adhering the substrates together. More particularly, it concerns a hot-melt adhesive composition consisting essentially of a blend of low- and high-molecular-weight polyvinyl acetate resins, a plasticizer for the resins, and between 10 and 120 parts of a hydrogenated pine gum for each 100 parts of the blend of low- and high-molecular-weight polyvinyl acetate resins.

Hot-melt adhesives are bonding materials known to be applied hot and upon cooling to the solid state to form a bond between substrates. Application of heat to a hot-melt adhesive brings it to a liquid state, and after removal of the heat it sets by merely cooling. Where the cooling is rapid, nearly instantaneous bonding is possible. The hot-melt adhesive system frequently offers increased production speeds and lower costs than other adhesive systems. In general, useful hot-melt adhesive compositions are essentially thermoplastic, all-solid material with no solvent being used therewith. In the past, a large number of natural and synthetic waxes and resins have served as principal constituents in various useful hot-melt adhesive compositions. The natural waxes and resins typically have low strength and melt easily to low viscosity fluids. Generally in hot-melt adhesives these natural materials are blended with various proportions of higher strength and higher molecular weight synthetic resins, such as polyamides, polyvinyl acetate, ethylene-vinyl acetate, or the like. In such compositions the synthetic resin acts as a film former imparting the principal adhesion strength and the natural resin serves to lower the adhesive's cost and is also useful therein to improve certain desirable properties of the hot-melt adhesive system. Many adhesives also contain some amount of a liquid plasticizer, resinous or monomeric, for improving film formation, imparting tack, flexibility, gloss, and the like. Desirable properties in a hot-melt adhesive are its adhesion strength to various substrates, heat stability at its application temperature for a prolonged period, i.e., useful pot life, ability to adequately wet the substrates to which it is applied, flexibility in its solid state, block resistance, and the like properties. Although various useful hot-melt adhesive compositions are known, there has continued to be a need for other and additional hot-melt adhesive compositions offering lower cost formulations and equivalent and/or improved properties and containing materials hitherto not known to be useful in such compositions. It is to fulfilling those needs that the present invention is directed.

In its usual meaning, pine gum is considered to be the natural oleoresin of pine trees (Pinus spp.) obtained by tapping, scarring, or chipping of living trunks of pine trees and collection of the exudate therefrom. Generally for commercial purposes, two important products—turpentine and rosin (colophony)—are separated, as by distillation means, from natural pine oleoresin and then marketed. In the United States most of the commercially available natural pine gums are from longleaf pine (Pinus palustris) and slash pine (Pinus caribaea). Of course other North American pines, as well as pines native to other regions of the world, are known to provide pine gum. Depending on the particular species of pine, its particular environment or climatic growing conditions, the particular method of collection of its oleoresin, and the like factors, the composition of natural pine gum will vary somewhat. As a general rule though, natural pine gum consists essentially of rosin and at least 20 percent by weight of turpentine. Pine gums of much higher turpentine content, such as the present-day commercial washed pine gum of about 35 percent turpentine content, are prepared by diluting pine gum with additional turpentine. Most of the chemical constituents of natural pine oleoresin have been identified, as illustrated by Joye, Jr., et al. in "J. Org. Chem." 31 (1), January 1966, wherein on page 321 is reported the composition of resin acid fraction of a typical sample of slash pine oleoresin. Typical and illustrative characteristics of pine oleoresin are a content of about 20 to 35 percent of levopimaric acid, a total resin acids content of about 80 percent, and an acid number of between 125 and 145.

In the present invention, the term "pine gum" is intended to include both the natural oleoresin of pine trees and also a synthetic or fabricated substantial duplicate thereof, which is readily preparable merely by blending gum, wood, or tall oil rosin and turpentine together in proportions found in pine oleoresin. Generally the useful pine gum which is subsequently hydrogenated for purposes of the invention is relatively clean, as by being substantially free from bark, twigs, needles, dirt, and like refuse, which are filterable from collected natural pine oleoresin. This useful pine gum contains at least about 15 percent by weight of turpentine, and a balance essentially of rosin (i.e., various resin acids) except for possibly up to a few percent total of other constituents. It may contain up to about 40 percent of turpentine and preferably contains between 15 and 40 percent turpentine.

The hot-metal adhesive composition of the invention consists essentially of three principal constituents, namely a blend of low- and high-molecular-weight polyvinyl acetate resins, a plasticizer for this blend of resins, and a hydrogenated pine gum. In the composition, in relative proportions by weight, for each 100 parts of the blend of polyvinyl acetate resins, there are included (a) a plasticizer for the resins in an amount between 20 and 60 parts, generally an amount between 20 and 50 parts, and (b) between 10 and 120 parts of hydrogenated pine gum. A preferred composition of the invention consists of 100 parts of the blend of polyvinyl acetate resins, between 20 and 50 parts of a liquid organic-ester plasticizer, and between 25 and 75 parts of hydrogenated pine gum.

Polyvinyl acetate resins in general are the homopolymers of vinyl acetate. They are well known in the art with numerous teachings available of their preparation, properties, and utilities. Relatively low-molecular-weight polyvinyl acetate resins have average molecular weights falling between about 5,000 to 30,000. These low-molecular-weight polymers are soft gum-like resins at room temperature. Higher-molecular-weight polyvinyl acetate resins are tougher and stronger. The polyvinyl acetate homopolymer's softening temperatures and melt viscosities vary widely with the degree of polymerization. In general the higher their average molecular weight the higher are their softening temperatures and their melt viscosities. Both low- and high-molecular-weight polyvinyl acetate resins are known to be useful for heat sealing purposes. The low-molecular-weight polymers are used at temperatures in the order of 70° to 80° C. and the high-molecular-weight polymers commercially available are used at temperatures of 125° C. and upwards for heat-sealing applications. For heat-sealing compositions generally the polyvinyl acetate resin is plasticized. Also because the low-molecular-weight polymers tend to block in hot weather and at high humidities and provide lower adhesion strength, frequently higher-molecular-weight polymers are utilized in whole or part in the heat-sealing composition.

In the composition of the present invention there is employed a blend of low- and high-molecular-weight polyvinyl acetate resins. The employed low-molecular-weight polyvinyl acetate resins have a weight-average molecular weight between 5,000 and 25,000. These low-molecular-weight polyvinyl acetate resins amount to between about ⅓ to ⅔ portion by weight of the blend. The balance of the blend is of high-molecular-weight polyvinyl acetate resin of a weight-average molecular weight between 45,000 and 150,000. Preferably the blend consists of equal parts of the high- and the low-molecular-weight polyvinyl resin.

The composition also includes, for each 100 parts by weight of the blend of polyvinyl acetate resins, between about 20 and 60 parts by weight of a liquid organic-ester plasticizer for the polyvinyl acetate resins, which plasticizer is of low volatility and is compatible with the hydrogenated pine gum. Preferably this liquid plasticizer is included in an amount between 40 and 50 parts by weight for each 100 parts by weight of the blend. The liquid plasticizer serves to increases flexibility of the adhesive, improve its flow and tack, and also to lower its melt temperature. In general useful liquid plasticizers are organic esters of alcohols with acidic materials, such as phthalic anhydride, sebacic acid, glycolic acid, and the like. Illustrative of these useful plasticizers are: methyl phthalyl ethyl glycolate; ethyl phthalyl glycolate; butyl phthalyl ethyl glycolate; dimethyl sebacate; dibutyl sebacate; dimethyl phthalate; diethyl phthalate; dibutyl phthalate; diamyl phthalate; tricresyl phosphate; and the like.

The third principal ingredient in the hot-melt adhesive composition of the invention is a hydrogenated pine gum. As stated earlier herein, pine gum includes the natural oleoresin of pine trees and also a synthetic or fabricated pine gum from blending rosin and turpentine. A hydrogenated pine gum is the pine gum after being subjected to hydrogenation to such an extent that its abietic acid content is reduced to less than seven percent by weight. The hydrogenation is performed with catalysts and by procedures conventional for hydrogenation of other rosinous materials. Hydrogenation results in substantial reduction in unsaturation of the rosin moieties and terpenes of the pine gum.

In the composition of the invention, the hydrogenated pine gum functions to reduce cost, increase adhesion, reduce viscosity, and increase heat stability of the hot-melt adhesive.

Although not essential thereto, the hot-melt adhesive composition of the invention also may contain minor amounts of various other and ancillary constituents as are known to the art in conventional amounts and for purposes well known in hot-melt adhesive compositions containing polyvinyl acetate resins. These useful ancillary constituents include waxes, fillers, pigments, dyes, stabilizers, and the like. Waxes can improve flow and spreading properties of the composition and lower application temperatures. Pigments, dyes, filler, and the like may be used to obtain colored or opaque adhesives and to reduce cost or to impart firmness. Illustrative of fillers are titanium dioxide, clay, diatomaceous earth, and the like. To avoid discoloration, gelation, or physical separation of the composition's constituents during excessive or prolonged heating to its melt state, stabilizers may be included. Illustrative of these stabilizers are sodium benzoate, calcium stearate, sodium sebacate, and the like. When used in the hot-melt composition, the sum total of all the various included ancillary constituents generally will not amount to more than about 25 percent by weight of the composition, and of course the amount of each included should not appreciably detrimentally affect the adhesive properties of the composition to such an extent as to render the composition not useful for the particular hot-melt application being contemplated.

In general, the hot-melt composition of the invention is prepared simply by melting and mixing together its lower melting constituents, i.e. the low-molecular-weight polyvinyl acetate resin, liquid plasticizer, and hydrogenated pine gum, and then adding and mixing therein the higher-melting constituent, i.e. the high-molecular-weight polyvinyl acetate resin, at a temperature above its melting point. Its preparation aspects closely approximate those conventional in preparation of hot-melt adhesive compositions. Thus one may employ extruders, kneading-type mixers, varnish kettles, or other like equipment suitably provided with heating means, e.g. oil or steam jackets, electric coil heaters, etc.

The hydrogenated pine gum included in the composition of the invention will be more fully understood from the several illustrative preparations thereof which follow.

EXAMPLE A

Six hundred grams of a commercially cleaned pine gum, having a 35 percent by weight turpentine content, is mixed with 6 grams of a 5 percent palladium-on-carbon catalyst and placed in a 1-liter pressure autoclave. The autoclave is pressurized with hydrogen to about 2000 p.s.i.g. and then the hydrogen bled off. Again a charge of about 2000 p.s.i.g. of hydrogen is applied. The autoclave is heated to 200° C. with stirring and held for two hours. When the temperature reaches 180° C., additional hydrogen is charged into the autoclave to raise the pressure to 4500 p.s.i.g. During the remainder of the two-hour period the pressure drops to about 4300 p.s.i.g. The autoclave then is permitted to cool to 100° C., the pressure lowered therein to atmospheric; and the charge removed. The palladium-on-carbon catalyst is removed by filtration from the charge, and the resulting hydrogenated pine gum steam sparged until its terpene content is 20 percent by weight. The product is a cold flowing hydrogenated pine gum resin of USDA rosin color grade WG, Acid No. 127. Its ultraviolet spectrum in 95% ethanol shows no peak at 241 m$\mu$ ($a=0$) indicating no abietic acid remaining, and a maximum at 276 m$\mu$ ($a=.61$) indicative of the presence of dehydroabietic acid.

EXAMPLE B

A "synthetic" pine gum is made by mixing 400 grams of WW gum rosin and 89 grams of freshly distilled alpha-pinene. To this pine gum there is added 5 grams of 5 percent palladium-on-carbon catalyst. It then is charged to a Magna-dash presure vessel and hydrogenated at 150°–155° C. and 50 p.s.i.g. hydrogen pressure for four hours. The resulting product then is removed from the pressure vessel and filtered to remove the catalyst therefrom. Product analysis is by gas-liquid chromatography on a Versamid 900 column and shows that essentially no levopimaric, palustric, neoabietic, and abietic acids are left in the product analysis is by gas-liquid chromatography on a Versamid Acid No. 117; Gardner-Holdt viscosity, about 2–6.

EXAMPLE C

A commercially cleaned pine gum, containing about 35 percent by weight of turpentine, is hydrogenated using 0.5 percent by weight of a 5 percent palladium-on-carbon catalyst in an autoclave for four hours at 50 p.s.i.g. hydrogen pressure and then is removed and filtered to separate the catalyst therefrom. The product is a cold-flowing resin, USDA color grade WG, Acid No. 130.

EXAMPLE D

A "synthetic" pine gum comprising a mixture of 800 grams of tall oil rosin and 200 grams of sulfate turpentine is hydrogenated using 1 percent by weight of a 5 percent palladium-on-carbon catalyst at 160° C. and 200 p.s.i.g. of hydrogen for hour hours. The charge then is removed and the catalyst separated therefrom by filtration. The product is a cold-flowing resin, USDA color grade WG, Acid No. 115, Gardner-Holdt viscosity about 2–6.

EXAMPLE E

A "synthetic" pine gum is prepared by mixing 800 grams of gum rosin with 200 grams of gum turpentine (i.e. a mixture of alpha- and beta-pinenes) and hydrogenated in a rocking autoclave over 1 percent by weight of a 5 percent palladium-on-carbon catalyst at 200° C. and 100 p.s.i.g. of hydrogen for five hours. Whereupon the charge is removed and filtered to remove the catalyst. The resulting product is a cold flowing resin, USDA color grade WW, Acid No. 125, essentially devoid of any abietic, levopimaric, neoabietic and palustric acid as determined by gas-liquid chromatography on a Versamid 900 column.

EXAMPLE F

A "synthetic" pine gum, prepared by mixing 800 grams of wood rosin and 200 grams of alpha-pinene, is hydrogenated at 155° C. and 50 p.s.i.g. of hydrogen for four hours. The charge then is removed and hydrogenation catalyst separated therefrom by filtration. The product is a syrup, Acid No. 120, USDA rosin color grade N.

Formulations 1, 2 and 3

There are prepared the following basic formulations, containing hydrogenated pine gum and polyvinyl acetate resin, to illustrate the hot-melt adhesive compositions of the invention.

|  | Formulation | | |
| --- | --- | --- | --- |
|  | 1 | 2 | 3 |
| Parts by weight of hydrogenated pine gum for each 100 parts by weight of polyvinyl acetate | 25 | 50 | 75 |
| Ingredients: | | | |
| Polyvinyl acetate resin: | | | |
| 18,000 average molecular weight | 25 | 25 | 25 |
| 90,000 average molecular weight | 25 | 25 | 25 |
| Hydrogenated pine gum | 12.5 | 25 | 37.5 |
| Plasticizer: Butylphthalyl butyl glycolate | 25 | 25 | 25 |

The formulations 1, 2 and 3 are prepared by placing the weighed amounts of the low-molecular-weight polyvinyl acetate resin, the plasticizer, and the hydrogenated pine gum in a stainless steel kettle equipped with a stirrer and an oil-bath heater surrounding the kettle. The kettle's contents are heated to about 165 to 180° C. with stirring and held at that temperature until the charge is molten and appears to be a uniform composition; generally this required about ½ to one hour. The high-molecular-weight polyvinyl acetate resin then is added and mixed therewith until again the composition appears to be a uniform molten mass free of lumps and the like. If desired, the composition may be permitted to become cooled, solidified, and then subsequently reheated to its molten state for use.

To illustrate utility and advantageous properties exhibited by the foregoing illustrative basic formulations as embodiments of hot-melt adhesive compositions of the invention, a number of physical properties are determined for compositions of these formulations and for the compositions utilized to bond various adherends by hot-melt techniques. For comparison therewith there also are prepared in a like manner the same formulations, except that no hydrogenated pine gum is included therein and except that the hydrogenated pine gum constituent is replaced on an equal weight basis by gum rosin and the pentaerythritol ester of partially hydrogenated rosin, and then in a like manner various physical properties determined for these comparison formulations and their bonding of adherends.

The following Tables I through IV present illustrative physical properties determined for a number of composition embodiments of the invention along with corresponding data determined on the just-mentioned comparison formulations. Details on preparation of samples for determination of the reported property data along with description of the tests conducted also are presented. Peel strength illustrates the comparative peel or stripping of the adhesive bond. The peel strength is the average load per unit width of bond line required to separate progressively one member from the other over the adhered surfaces at a separation angle of approximately 180 degrees and at a separation rate of 12 inches per minute jaw speed. Samples prepared for the peel strength test are laminated in a Preco press at 300° F., 100 p.s.i., for 5 to 10 seconds. The samples are placed between two stainless steel plates of ⅛-inch thickness. Two sheets of 10-ml. tetrafluoroethylene polymer are used between the stainless steel plates and the samples. This was done to aid in removal of samples should hot-melt adhesive get on the plates during lamination. The peel strength of the adhesive bond is evaluated using ASTM Method D903–49 except that the number of test specimens is reduced to two.

The wettability of the adhesive on the substrate is determined by a visual check, rating the specimens excellent, good, fair, or poor.

A modification of TAPPI Method T454ts—66 is used to determine the flexibility of the film of hot-melt adhesive. Films of adhesive are drawn down on 60-pound all-purpose litho paper. A modification of TAPPI Method T465sm–52 is used for creasing the paper with an approximate 2-mil thick hot-melt adhesive film. The weight used to crease the specimens is 1 kg. per 5 linear centimeters. With the hot-melt side up on a table, a 3-inch diameter, clear plastic tube approximately 3 inches high is placed on each specimen. Sand is placed in the cylinder to a depth of one inch. The same is saturated with corn oil which has been dyed blue with oil blue NE. The dyed oil penetrates the specimen wherever there is a break in the hot-melt film. After 16 hours at room temperature, the samples are evaluated on a rating scale of excellent, very good, good, fair, or poor. An excellent rating indicates no penetration of dyed oil, and a poor rating indicates that the underside of the 4-inch square had more than 50 percent of its area colored with the dyed oil.

The block resistance of the hot-melt systems is determined by TAPPI Method T477m–47. The tests are run at 120° F. in an uncontrolled humidity oven at 0.5 p.s.i.

The viscosity of the hot-melt adhesives is run on a Ferranti-Shirley viscometer at 135° C. Several viscosity readings are taken to obtain a better picture of behavior at different shear rates.

TABLE I

Peel Strength

| Hot-melt adhesive composition containing— | Concentration, phr. [b] | Adhesion, p.l.i. [a] | | | |
|---|---|---|---|---|---|
| | | Polyethylene terephthalate film | 40-lb. kraft liner board | Laminate: 40-lb. kraft liner board/ aluminum foil | After heat-stability test [d] on polyester film |
| No rosin or rosin derivative | 0 | 1.4 | 2.1 | 6.4 | 1.0 |
| Gum rosin [c] | 75 | 1.6 | 2.4 | 2.6 | 0.2 |
| Pentaerythritol ester of partially hydrogenated rosin | 25 | 1.6 | 2.2 | 4.5 | 0.6 |
| Hydrogenated pine gum of Example A in— | | | | | |
| Formulation 1 | 75 | 4.6 | 2.0 | 4.5 | 4.4 |
| Formulation 2 | 50 | 4.3 | | | |
| Formulation 3 | 25 | 3.7 | | | |

[a] P.l.i.=Pounds per linear inch.
[b] Phr.=Parts rosin derivative per hundred parts of polyvinyl acetate resins.
[c] Controls.
[d] 18 hours at 350° F. using agitation.

NOTE: Hot melt adhesive composition is coated on specified substrate with a brass draw-down bar on a stainless steel hotplate using 330° F. Applied coating weights are: 19.1 lb./1,000 ft.$^2$ on polyethylene terephthalate film; 22.4 lb./1,000 ft.$^2$ on 40 lb. kraft liner board; 6.5 lb./1,000 ft.$^2$ on aluminum foil. Laminate specimens are laminated in a Preco press at 300° F., 100 p.s.i., for 10 sec. All samples and specimens conditioned at 73° F., 50% rel. humidity for 7 days before peel strength determination on an Instron at a speed of 12 in./min.

TABLE II

Viscosity Values

| Hot-melt adhesive composition containing— | Concentration, phr.[a] | Viscosity at 135° C. | |
|---|---|---|---|
| | | Before heat-stability test | After heat-stability test [c] |
| No rosin or rosin derivative | 0 | 73.76 | 89.23 |
| Gum rosin [b] | 75 | 29.38 | 33.31 |
| Pentaerythritol ester of partially hydrogenated rosin [b] | 25 | [d]9.51 | 27.00 |
| Hydrogenated pine gum of Example A in Formulation 3 | 75 | 27.72 | 44.02 |

[a] Phr.=Parts rosin derivative per hundred parts of polyvinyl acetate resins.
[b] Controls.
[c] Heated 18 hours at 350° F.
[d] Incompatible.

TABLE III

Viscosity Values

| Hot-melt adhesive composition containing— | Concentration, phr.[a] | Viscosity at 135° C. | |
|---|---|---|---|
| | | Before stability test | After stability test [b] |
| No rosin or rosin derivative | 0 | 77.11 | 94.24 |
| Control (W.W. gum rosin) | 75 | 30.70 | 33.99 |
| Pentaerythritol ester of partially hydrogenated rosin Pentalyn H | 25 | 10.00 | 27.13 |
| Hydrogenated pine gum of Example A in Formulation 3 | 75 | 28.13 | 44.70 |

[a] Phr.=Parts rosin or rosin derivative per hundred parts of polyvinyl acetate resins.
[b] Heated 18 hours at 350° F.

TABLE IV

Property Data

| Hot-melt adhesive composition containing— | Concentration, phr. | Color of hot melt | | Flexibility of hot-melt film [b] | | Blocking tests [c] | Wettability test [d] | | | |
|---|---|---|---|---|---|---|---|---|---|---|
| | | Before stability test | After stability test | Sample 1 | Sample 2 | | Mylar | 40 KBL | 60 APL | Al foil |
| No rosin or rosin derivative | 0 | Slight yellowish hue. | Amber | VG | VG | 4 | 4 | 4 | 4 | 4 |
| Control—W.W. rosin | 75 | Cream | Golden cream. | F | G | 4 | 3–4 | 4 | 4 | 2 |
| Control—Pentalyn H | 25 | do | Yellowish brown. | G | P | 4 | 3 | 4 | 3 | 2 |
| Hydrogenated pine gum of Example A in Formulation 3. | 25 | Dark golden yellow. | Black | E | E | 4 | 4 | 4 | 4 | 4 |

[a] Stability test was run at 350° for 18 hours using agitation.
[b] Flexibility ratings: E=Excellent; VG=Very good; G=Good; F=Fair; P=Poor.
[c] Blocking test was run at 120 °F. for 24 hours at 0.5 p.s.i. Blocking ratings: 4=Complete; 3=Considerable; 2=Slight; and 1=No.
[d] Substrate abbreviations: Mylar=(1½ mil); 40 KLB=40-lb. kraft liner board; 60 APL=60-lb. all purpose litho paper; Al foil=1 mil pure aluminum foil. Applied coating weights in lbs./1,000 ft.$^2$ on Mylar—19.1; on 40 KLB—22.4; on 60 APL—16.6; and on Al foil—6.5. Wettability ratings: 4=Excellent; 3=Good; 2=Fair; 1=Poor.

In addition to the preceding illustrative embodiments of the composition of the invention, one similarly can employ each of the hydrogenated pine gums of Example A through F in each of the basic formulations 1 through 3 and obtain other illustrative examples of the composition of the invention. While the properties of such prepared additional compositions will not necessarily be identical to the property data determined and reported in the foregoing tables, it will be found that on the whole each of these prepared hot-melt adhesive compositions exhibit adequate properties to enable the composition to be useful in hot-melt adhesive bonding applications.

We claim:

1. A hot-melt adhesive composition in relative proportions by weight consisting essentially of
   (a) 100 parts of a blend of polyvinyl acetate resins of which between ⅓ and ⅔ are resins of a low molecular weight having an average molecular weight between 5,000 and 25,000 and the balance are resins of a high molecular weight having an average molecular weight between 45,000 and 150,000;

(b) between 20 and 60 parts of a liquid organic-ester plasticizer for said resins; and (c) between 10 and 120 parts of a hydrogenated pine gum having an abietic acid content of less than seven percent.

2. The composition of claim 1 which contains between 20 and 50 parts of said hydrogenated pine gum.

3. The composition of claim 1 wherein the blend of the polyvinyl acetate resins is composed of equal parts of the high- and low-molecular-weight resins.

4. The composition of claim 2 wherein the hydrogenated pine gum is obtained by hydrogenation of the natural oleoresin of pine trees.

5. The composition of claim 2 wherein the hydrogenated pine gum from hydrogenation of a synthetic pine gum consists essentially of a mixture of rosin and turpentine with the turpentine accounting for between 15 and 40 percent by weight of the mixture.

References Cited

UNITED STATES PATENTS

| | | | |
|---|---|---|---|
| 1,787,239 | 12/1930 | Fleischmann | 260—24 |
| 2,094,117 | 9/1937 | Byrkit | 260—100 |
| 3,239,478 | 3/1966 | Harlan | 260—27 |

FOREIGN PATENTS

| | | | |
|---|---|---|---|
| 1,167,516 | 10/1969 | Great Britain | 260—24 |
| 1,167,517 | 10/1969 | Great Britain | 260—24 |

OTHER REFERENCES

"Encyclopedia of Chemical Technology," Harris, 1953 (pp. 794 and 795).

DONALD E. CZAJA, Primary Examiner

W. E. PARKER, Assistant Examiner

U.S. Cl. X.R.

260—27, 37